United States Patent Office 3,095,419
Patented June 25, 1963

3,095,419
PROCESS FOR PREPARING 2-OXO-3-(N,N-DISUB-
STITUTED CARBOXAMIDO) - 1,2,3,4,6,7 - HEXA-
HYDRO-11b-H-BENZOPYRIDOCOLINES
James R. Tretter, Niantic, Conn., assignor to Chas. Pfizer
& Co., Inc., New York, N.Y., a corporation of Delaware
No Drawing. Filed Sept. 6, 1961, Ser. No. 136,186
8 Claims. (Cl. 260—287)

This invention relates to a new and useful method for preparing organic ring-nitrogen compounds. More particularly, it is concerned with a novel process for the production of various 2-oxo-3-(N,N-disubstituted carboxamido) - 1,2,3,4,6,7 - hexahydro - 11b - H - benzopyridocolines which are known to be of value for their hypotensive and/or sedative effects. There is also included within the scope of this invention various novel intermediates for the production of these compounds and the method of producing such intermediates.

The compounds with which the process of the present invention is concerned, viz., the 2-oxo-3-carboxamido-1,2,3,4,6,7 - hexahydro - 11b - H - benzopyridocolines referred to above, all possess the following characteristic ring system as is shown below by the following illustrated structural formula:

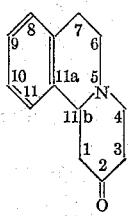

In accordance with the prior art, it was only heretofore possible to prepare such type compounds by a series of long, drawn-out steps which essentially involve the condensation of a 1-(lower carboalkoxymethyl)-1,2,3,4-tetrahydroisoquinoline with formaldehyde and an appropriately substituted malonic acid dimethyl ester to form a product that can be subsequently cyclized to the desired ring system. This reaction sequence is more fully described by A. Brossi et al. in German Patent 1,068,261 (November 5, 1959) as well as in Belgian Patent 565,824 (March 18, 1958). Conversion of the benzopyridocoline esters so prepared to the desired amides is then readily accomplished in the manner disclosed by J. G. Lombardino et al. in copending U.S. patent application Serial No. 13,721, filed March 9, 1960, and now U.S. Patent No. 3,055,894. Unfortunately, this over-all method suffers from a number of disturbing drawbacks, among which are: the low yields afforded; the use of expensive reagents; the difficulty involved in isolating pure product; and the time and expense caused by the number of steps connected with the process. All this, of course, adds up to a very poor over-all economic picture which may very well spell the difference between commercial success or failure in producing these compounds on a large scale.

In accordance with the present invention, it has now been found possible to prepare 2-oxo-3-(N,N disubstituted carboxamido) - 1,2,3,4,6,7 - hexahydro - 11b - H-benzopyridocolines by a one-step process which circumvents all the attendant disadvantages of the prior art. This particular process of the present invention involves reacting a 3,4-dihydroisoquinoline acid addition salt with a N,N-disubstituted acetoacetamide compound in the presence of formaldehyde to form the desired benzopyridocoline. In this way, yields ranging as high as 65–85% have been obtained and the resultant product isolated from the reaction mixture in a relatively pure state with a minimum of time and effort. Moreover, this represents an average over-all (three-step) yield in the neighborhood of 60% starting from the corresponding β-phenylethylamine used to prepare the 3,4-dihydroisoquinoline compound as compared to a corresponding value of about 15–20% obtained when using the seven-step Brossi et al.-Lombardino et al. combined procedure previously referred to. Among the typical examples of valuable products afforded by the process of this invention are such compounds as 2-oxo-3-(N,N-diethylcarboxamido) - 1,2,3,4,6,7 - hexahydro - 11b - H - benzopyridocoline and 2 - oxo - 3 - (N - ethyl - N - isopropyl-carboxamido) - 9,10 - dimethoxy - 1,2,3,4,6,7 - hexahydro-11b-H-benzopyridocoline.

In accordance with the process of this invention, a 3,4-dihydroisoquinoline acid addition salt, such as a hydrohalide salt or the nitrate, sulfate or phosphate, is contacted with formaldehyde and a N,N-disubstituted acetoacetamide where the substituted group is preferably lower alkyl, but may also be mixed alkyl-aryl groups such as N-(lower alkyl)-N-aryl, etc. A convenient source of formaldehyde such as paraformaldehyde may be used. The reaction yields a 2-oxo-3-(N,N-disubstituted carboxamido) - 1,2,3,4,6,7 - hexahydro - 11b - H - benzopyridocoline, which may or may not be substituted at the 9,10-positions of the molecule depending upon whether or not the 3,4-dihydroisoquinoline starting material is correspondingly substituted at the 6,7-positions of same (e.g., with such groups as alkyl having from one to five carbon atoms, lower alkoxy, 6,7-methylenedioxy, etc.). This reaction may be suitably illustrated as follows:

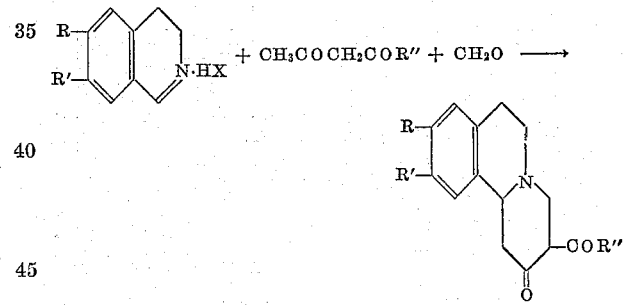

wherein R and R' are each members selected from the group consisting of hydrogen, alkyl having from one to five carbon atoms and lower alkoxy, and when both R and R' are taken together they form a methylenedioxy group; R" is a member selected from the group consisting of N,N-diethylamino, N,N-diisopropylamino, N-ethyl-N-isopropylamino, N-(lower alkyl)-N-phenylamino and N-(lower alkyl)-N-(p-tolyl) amino; and X is the anion of any acid addition salt and especially the hydrochloride, hydrobromide, hydriodide, nitrate, sulfate and phosphate salts.

In general, the process is carried out in a reaction-inert polar organic solvent at a temperature that is in the range of from about 20° C. up to about 100° C. for a period of about one to about twenty-four hours. Preferred reaction-inert organic solvents in this connection include such water-miscible lower alkanols as methanol, ethanol, isopropanol, and the like, as well as such N,N-dialkyl lower alkane hydrocarbon carboxamides as N,N-dimethylformamide, N,N-diethylformamide, N,N-dimethylacetamide, etc. The amount of each reagent employed in this reaction will vary to some extent depending upon their relative ease of synthesis and/or availability, but it is usually advisable to employ at least an equimolar amount of both the N,N-disubstituted acetoacetamide and the formaldehyde reagent with respect to the 3,4-dihydroisoquinoline starting material since the reaction proceeds on a 1:1:1 molar basis. A preferred reactant ratio in this connection has been found to be 1.5 molar equivalents each of the amide and formaldehyde reagents per one equivalent of the 3,4-dihydroisoquinoline compound. Incidentally, the formaldehyde reagent employed may be the 37% aqueous formaldehyde of commerce (which is preferred), more commonly known as formalin, or it may be generated into the reaction mixture in situ by depolymerizing the readily available paraformaldehyde with concentrated hydrochloric acid.

In accordance with a more preferred embodiment of the process of the present invention, a 3,4-dihydroisoquinoline hydrohalide is reacted in a lower alkanol solvent medium containing concentrated hydrochloric acid with at least an equimolar amount of the N,N-di-substituted acetoacetamide in the presence of an equivalent amount in moles of paraformaldehyde under the aforestated reaction conditions. In this case, the hydrochloric acid must be present in sufficient amount to substantially convert, i.e., depolymerize, all the paraformaldehyde present to formaldehyde under the conditions of the reaction. The N,N-disubstituted acetoacetamide and paraformaldehyde reagents, however, need only be present in equimolar amount with respect to one another, even though used in excess with respect to the 3,4-dihydroisoquinoline starting material (preferred reaction conditions usually call for a one molar excess). As previously indicated, any temperature in the aforestated range of from about 20° C. up to about 100° C. is most satisfactory for these purposes, i.e., for effecting the reaction, but in practice, it is generally most convenient to carry out the reaction at the reflux temperature of the reaction mixture and especially so when the solvent employed is a lower alkanol of the type hereinbefore set forth.

Recovery of the desired products from the reaction mixture is, as previously indicated, readily accomplished. Moreover, this can be done by either one of two general methods depending on whether the 2-oxobenzopyridocoline acid addition salt precipitates from solution or not after the reaction reflux period is completed. For instance, if such precipitation does occur, the crystallized salt can be collected by means of suction filtration and further purified by means of recrystallization or immediately converted as such to the free base by any number of standard procedures and then purified by recrystallization, say, for example, from aqueous alcohol in the presence of charcoal. On the other hand, if the salt does not precipitate from the reaction mixture, the solvent can be removed therefrom by means of evaporation under reduced pressure and the resultant residue taken up in water and extracted with a water-immiscible organic solvent such as an aromatic hydrocarbon solvent like benzene, toluene, xylene, and so forth, or a halogenated hydrocarbon such as methylene chloride, chloroform, trichloroethylene, s-tetrachloroethane, and the like. The so-treated aqueous layer is then adjusted to a basic pH value and extracted once again with one of the aforementioned water-immiscible organic solvents. Upon subsequent evaporation of the organic extract in the usual manner, the product is obtained, although further purification via the recrystallization route may still be carried out, if so desired.

The starting materials which are required for carrying out the process of the present invention are, for the most part, known compounds or else they are easily prepared in accordance with standard organic procedures previously described in the literature. For instance, the 3,4-dihydroisoquinoline-type ring structure can be best synthesized via the cyclodehydration procedure of H. R. Snyder and F. X. Weber as described more fully in the Journal of the American Chemical Society, vol. 72, p. 2962 (1950). Briefly, this method involves treating the appropriate N-formyl-β-phenylethylamine compound with polyphosphoric acid. The N,N-disubstituted acetoacetamide component of the reaction mixture, on the other hand, is readily prepared by the method of Kaslow and Cook as described in the Journal of the Americal Chemical Society, vol. 67, p. 1969 (1945).

This invention is further illustrated by the following examples, which are not to be construed in any way as imposing limitations up on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

To 22 g. of diethylamine cooled in an ice bath there was slowly added with stirring 21.8 g. of diketene. After the addition was complete, the reaction mixture was heated on the steam bath for 30 minutes and then fractionally distilled under reduced pressure. In this manner, there was obtained a 92% yield of N,N-diethylacetoacetamide in the form of a pale yellow oil boiling at 109–112° C./ 4.5 mm. Hg.

*Analysis.*—Calcd. for $C_8H_{15}NO_3$: C, 61.15; H, 9.55; N, 8.92. Found: C, 60.82; H, 9.77; N, 9.28.

*Example II*

The procedure described in Example I is followed except that N-ethyl-N-isopropylamine is used in place of diethylamine on an equimolar basis and the product obtained is N-ethyl-N-isopropylacetoacetamide, B.P. 109–110° C./4.0 mm. Hg.

*Analysis.*—Calcd. for $C_9H_{17}NO_2$: C, 63.13; H, 10.00. Found: C, 62.78; H, 10.15.

*Example III*

The procedure described in Example I is followed except that diisopropylamine is employed in place of diethylamine on an equimolar basis and the product obtained is N,N-diisopropylacetoacetamide, B.P. 104–107° C./5.0 mm. Hg.

*Analysis.*—Calcd. for $C_{10}H_{19}NO_2$: C, 64.53; H, 10.34; N, 7.56. Found: C, 64.53; H, 10.33; N, 7.82.

*Example IV*

The procedure described in Example I is followed except other N,N-disubstituted amines are individually employed in place of diethylamine on an equimolar basis. Among these amines are dimethylamine, N-methyl-N-phenylamine, N-ethyl-N-phenylamine and N-ethyl-N-(p-tolyl)-amine. In each and every case, the corresponding N,N-disubstituted acetoacetamide compound is the product actually obtained.

*Example V*

In a 1000 ml. three-necked, round-bottomed flask equipped with dropping funnel, reflux condenser and mechanical stirrer were placed 26.8 g. (0.1 mole) of 3,4-dihydroisoquinoline hydrochloride, 31.8 g. (0.2 mole) of N,N-diethylacetoacetamide and 18 g. (0.2 mole) of paraformaldehyde dissolved in 500 ml. of isopropyl alcohol. Stirring was then commenced, while 25 ml. of concentrated hydrochloric acid was slowly run into the mixture. The dropping funnel was then replaced by a gas inlet tube and the resultant well-stirred reaction mixture was refluxed for five hours under a nitrogen atmosphere. Upon completion of this step, the hydrochloric acid addition salt of 2-oxo-3-(N,N-diethylcarboxamido)-1,2,3,4,6,7-hexahydro-11b-H-benzopyridocoline slowly crystallized from solution as the latter was cooled to room temperature. It was subsequently collected by means of vacuum filtration on a filter funnel and purified by means of recrystallization from ethyl acetate to afford the pure hydrochloride. An aqueous solution of the latter salt was then extracted with benzene and the resultant aqueous layer made basic with sodium carbonate. Benzene extraction of the basic aqueous layer and subsequent evaporation of the resulting extracts gave a 79% yield of 2-oxo-3-(N,N-diethylcarboxamido)-1,2,3,4,6,7-hexahydro-11b-H-benzopyridocoline, M.P. 87–89° C.

Analysis.—Calcd. for $C_{18}H_{24}N_2O_2$: C, 71.97; H, 8.05; N, 9.33. Found: C, 71.93; H, 7.87; N, 9.36.

Example VI

The reaction procedure described in Example V was repeated except that 6,7-dimethoxy-3,4-dihydroisoquinoline hydrochloride (32.8 g., 0.1 mole) was substituted in place of the parent compound as the starting material of choice and the reflux time was extended to 24 hours. Upon completion of this step, the reaction mixture was worked up in the following manner: (1) the isopropanol solvent was removed by means of evaporation under reduced pressure, and (2) the residue was taken up in water and extracted with benzene. The isolation procedure thereafter followed was exactly the same as that described in Example V. In this way, there was obtained a 66% yield of 2-oxo-3-(N,N-diethylcarboxamido)-9,10-dimethoxy-1,2,3,4,6,7-hexahydro-11b-H-benzopyridocoline, M.P. 154–156° C.

Example VII

The procedure described in Example V was followed except that the starting materials employed in conjunction with paraformaldehyde and concentrated hydrochloric acid were 6,7-dimethoxy-3,4-dihydroisoquinoline hydrochloride and N-ethyl-N-isopropylacetoacetamide, respectively. Thus, when these four materials were all reacted together in the same molar proportions as used in Example V but extending the reaction reflux time to 24 hours, there was obtained a 72% yield of 2-oxo-3-(N-ethyl-N-isopropylcarboxamido)-9,10-dimethoxy-1,2,3,4,6,7-hexahydro-11b-H-benzopyridocoline, M.P. 156–158° C.

Example VIII

The procedure described in Example V was followed except that 7-nitro-3,4-dihydroisoquinoline hydrochloride (31.3 g., 0.1 mole) was substituted in place of the parent compound as the starting material of choice in this particular reaction scheme and the reflux time was shortened to 2.5 hours. In this way, there was obtained a 63% yield of 2-oxo-3-(N,N-diethylcarboxamido)-10-nitro-1,2,3,4,6,7-hexahydro-11b-H-benzopyridocoline, M.P. 159–160.5° C.

Analysis.—Calcd. for $C_{18}H_{23}N_3O_4$: C, 62.56; H, 6.71; N, 12.17. Found: C, 62.44; H, 6.51; N, 12.32.

The 7-nitro-3,4-dihydroisoquinoline starting material referred to above was prepared by the method of McCourbrey as described in the Journal of the Chemical Society (London), p. 2851 (1951).

Example IX

The procedure described in Example V was followed except that 7-chloro-3,4-dihydroisoquinoline hydrochloride (30.25 g., 0.1 mole) was the starting material employed in place of the corresponding parent compound and the reflux time was shortened to four hours. In this manner, there was obtained a 69% yield of 2-oxo-3-(N,N-diethylcarboxamido)-10-chloro-1,2,3,4,6,7-hexahydro-11-b-H-benzopyridocoline, M.P. 129–131.5° C.

Analysis.—Calcd. for $C_{18}H_{23}ClN_2O_2$: C, 64.56; H, 6.92; N, 8.37. Found C, 64.53; H, 6.93; N, 8.18.

The 7-chloro-3,4-dihydroisoquinoline starting material referred to above was prepared by running a Sandemeyer reaction on the corresponding 7-amino compound, which in turn was obtained by selectively reducing the 7-nitro group of the starting material used in the previous example.

Example X

The procedure described in Example V was followed except that 7-fluoro-3,4-dihydroisoquinoline hydrochloride (28.6 g., 0.1 mole) was the starting material employed in place of the corresponding parent compound and the reflux time was shortened to four hours. In this manner, there was obtained a 68% yield of 2-oxo-3-(N,N-diethylcarboxamido)-10-fluoro-1,2,3,4,6,7-hexahydro-11b-H-benzopyridocoline, M.P. 96.5–98° C.

The 7-fluoro-3,4-dihydroisoquinoline starting material referred to above was prepared by running a Schiemann reaction on the aforementioned corresponding 7-amino compound.

Example XI

The procedure described in Example V is followed except that other 3,4-dihydroisoquinolines are employed on the same molar basis (in the form of their hydrochlorides) as starting materials in place of the 6,7-dimethoxy compound used in the aforementioned example. For the sake of time and convenience and in order to avoid any unnecessary repetition of experimental detail, these organic bases are listed below as follows:

6,7-diethoxy-3,4-dihydroisoquinoline
6,7-diisopropoxy-3,4-dihydroisoquinoline
6,7-di(n-butoxy)-3,4-dihydroisoquinoline
6,7-methylenedioxy-3,4-dihydroisoquinoline
6,7-dimethyl-3,4-dihydroisoquinoline
6,7-diethyl-3,4-dihydroisoquinoline
6,7-di(n-propyl)-3,4-dihydroisoquinoline
6,7-diisoamyl-3,4-dihydroisoquinoline
6-methyl-7-methoxy-3,4-dihydroisoquinoline
6-methyl-3,4-dihydroisoquinoline
6-methoxy-3,4-dihydroisoquinoline
6-ethoxy-7-methoxy-3,4-dihyroisoquinoline
7-methyl-3,4-dihydroisoquinoline
7-methoxy-3,4-dihydroisoquinoline
7-acetamido-3,4-dihydroisoquinoline In each and every case, the appropriately substituted (at the 9,10-positions, that is) 2-oxo-3-(N,N-diethylcarboxamido)-1,2,3,4,6,7-hexahydro-11b-H-benzopyridocoline is the corresponding product obtained.

Example XII

The procedure described in Example V is followed except that the other N,N-disubstituted acetoacetamides prepared in Examples II–IV are individually employed here as starting materials on the same molar basis as N,N-diethylacetoactamide was used in Example V. For the sake of time and convenience and in order to avoid unnecessary repetition of experimental detail, these particular starting materials are listed below as follows:

N,N-dimethylacetoacetamide
N-ethyl-N-isopropylacetoacetamide
N,N-diisopropylacetoacetamide
N-methyl-N-phenylacetoacetamide
N-ethyl-N-phenylacetoacetamide
N-ethyl-N-(p-tolyl)acetoacetamide In each and every case, the corresponding 2-oxo-3-(N,N-disubstituted carboxamido)-9,10-dimethoxy-1,2,3,4,6,7-hexahydro-11b-H-benzopyridocoline compound is the product obtained.

Example XIII

The procedure described in Example V is followed except that other acid addition salts of 3,4-dihydroisoquinoline are individually employed as starting materials in this reaction on the same molar basis as was the hydrochloride used in the aforementioned example. Specifically, these are the hydrobromide, hydriodide, nitrate, sulfate and phosphate. In each and every case, the product obtained is 2-oxo-3-(N,N-diethylcarboxamido)-1,2,3,4,6,7-hexahydro-11b-H-benzopyridocoline, the yield being of substantially the same order of magnitude as that reported in Example V.

What is claimed is:

1. A process for the production of a 2-oxo-3-(N,N-disubstituted carboxamido)-1,2,3,4,6,7-hexahydro-11b-H-benzopyridocoline wherein the substituted carboxamido moiety is chosen from the group consisting of N,N-di(lower alkyl)-carboxamido, N-(lower alkyl) - N - (p-tolyl)carboxamido and N-(lower alkyl) - N - phenylcarboxamido, which comprises contacting a 3,4-dihydroisoquinoline acid addition salt in a reaction-inert polar organic solvent with at least a molar equivalent of a correspondingly N,N-disubstituted acetoacetamide compound in the presence of an equivalent amount in moles of formaldehyde at a temperature that is in the range of from about 20° C. up to about 100° C. for a period of about one to about twenty-four hours.

2. A process as claimed in claim 1 wherein the acid addition salt is a member selected from the group consisting of the hydrochloride, hydrobromide, hydriodide, nitrate, sulfate and phosphate salts.

3. A process as claimed in claim 1 wherein the reaction-inert polar organic solvent is a lower alkanol.

4. A process as claimed in claim 3 wherein the reaction is conducted at the reflux temperature of the reaction mixture.

5. A process as claimed in claim 1 wherein the formaldehyde reagent is generated in situ by the acidic depolymerization of paraformaldehyde with concentrated hydrochloric acid.

6. A process for the production of a 2-oxo-3-(N,N-disubstituted carboxamido)-1,2,3,4,6,7-hexahydro-11b-H-benzopyridocoline wherein the substituted carboxamido moiety is chosen from the group consisting of N,N-di(lower alkyl) - carboxamido, N - (lower alkyl - N - (p-tolyl)carboxamido and N-(lower alkyl) - N - phenylcarboxamido, which comprises contacting a 3,4-dihydroisoquinoline hydrohalide acid addition salt in a lower alkanol solvent medium containing concentrated hydrochloric acid with at least an equimolar amount of a correspondingly N,N-disubstituted acetoacetamide compound in the presence of an equivalent amount in moles of paraformaldehyde at a temperature that is in the range of from about 20° C. up to about 100° C. for a period of about one to about twenty-four hours, said concentrated hydrochloric acid being present in sufficient amount to substantially depolymerize all the paraformaldehyde present to formaldehyde under the conditions of the reaction.

7. A process as claimed in claim 6 wherein the principal starting materials are 3,4-dihydroisoquinoline hydrochloride and N,N-diethylacetoacetamide.

8. A process as claimed in claim 6 wherein the principal starting materials are 6,7-dimethoxy-3,4-dihydroisoquinoline hydrochloride and N-ethyl-N-isopropylacetoacetamide.

References Cited in the file of this patent
UNITED STATES PATENTS
3,009,918     Openshaw et al. _____ Nov. 21, 1961